Patented Jan. 20, 1942

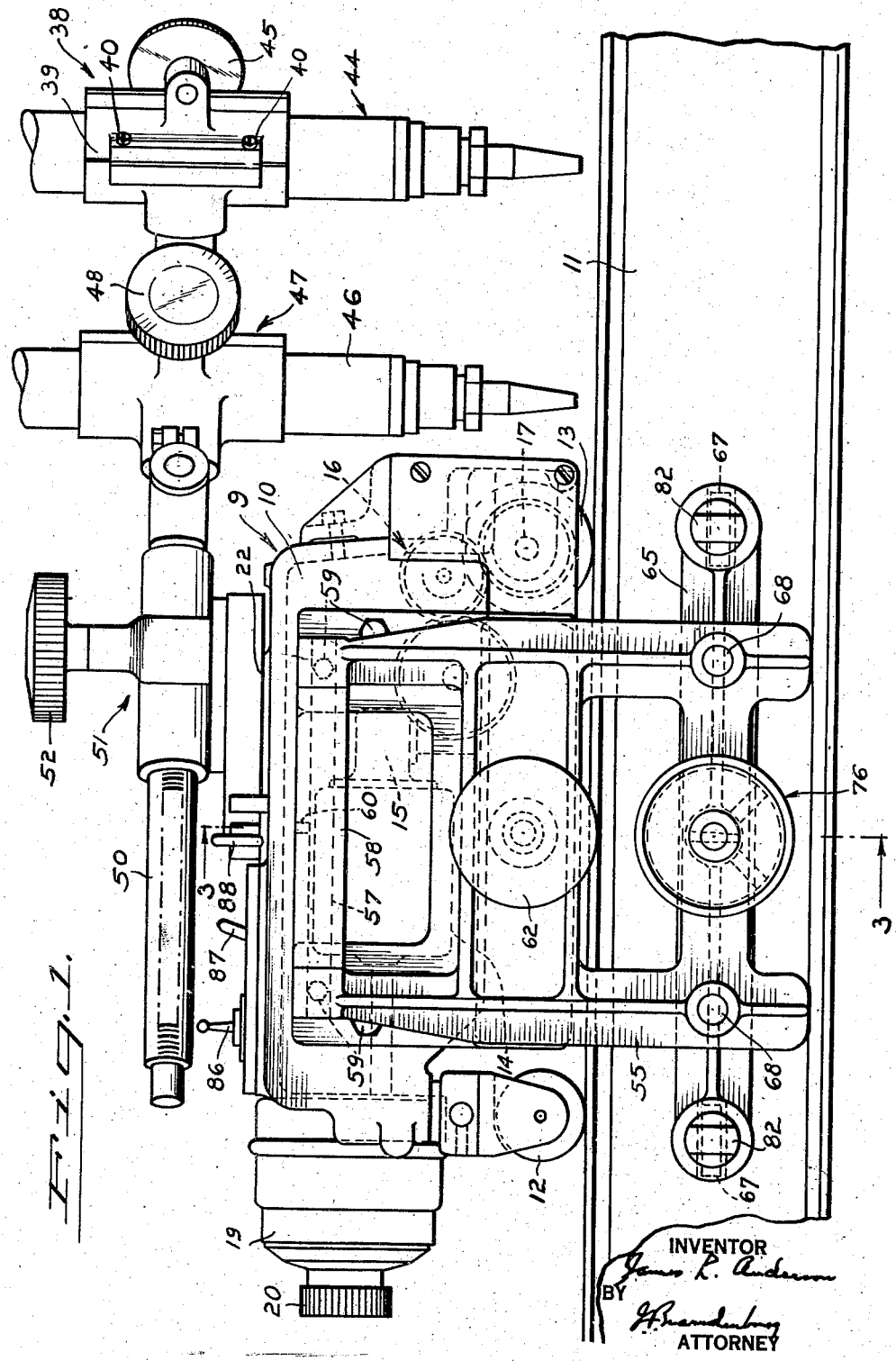

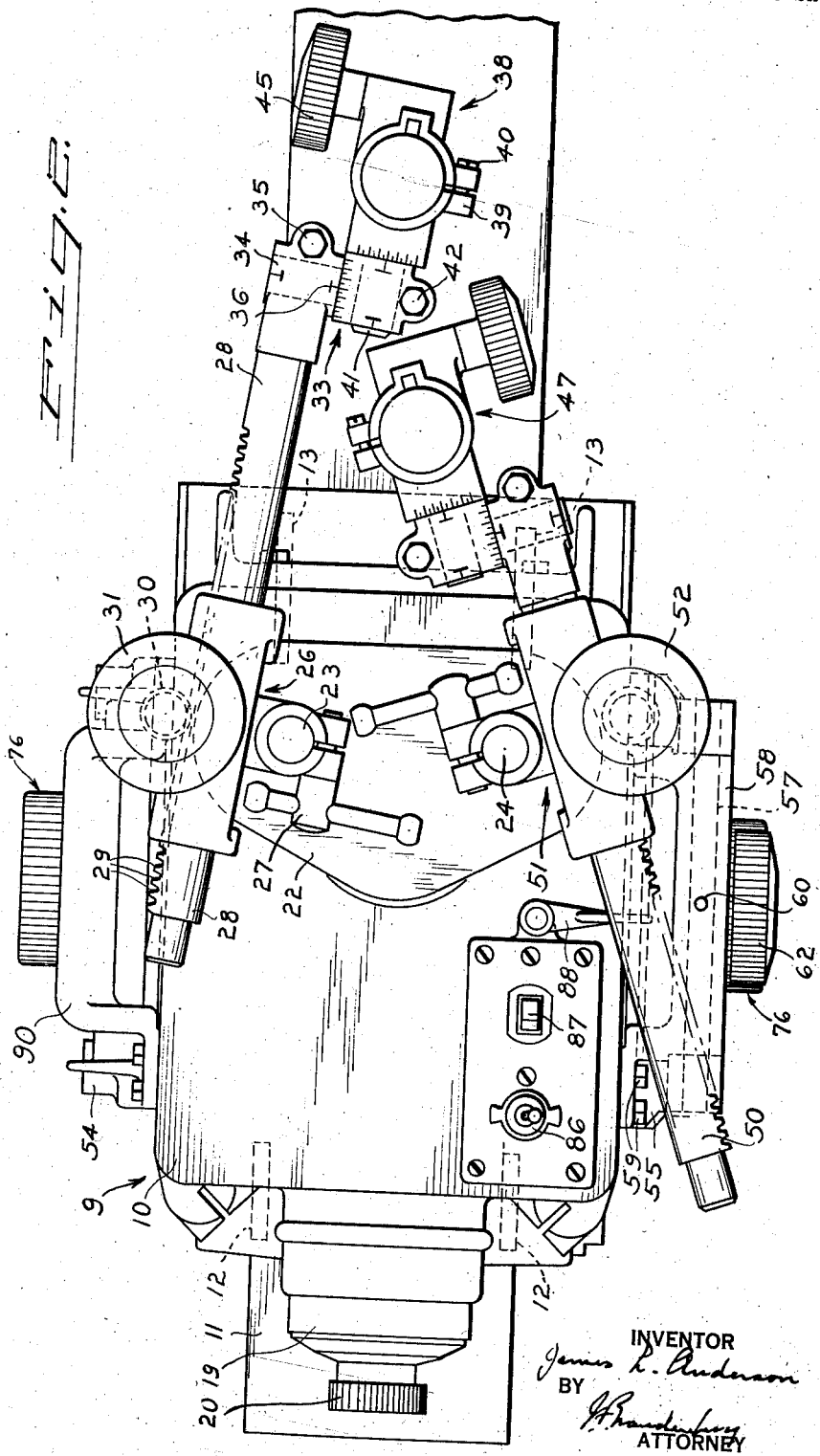

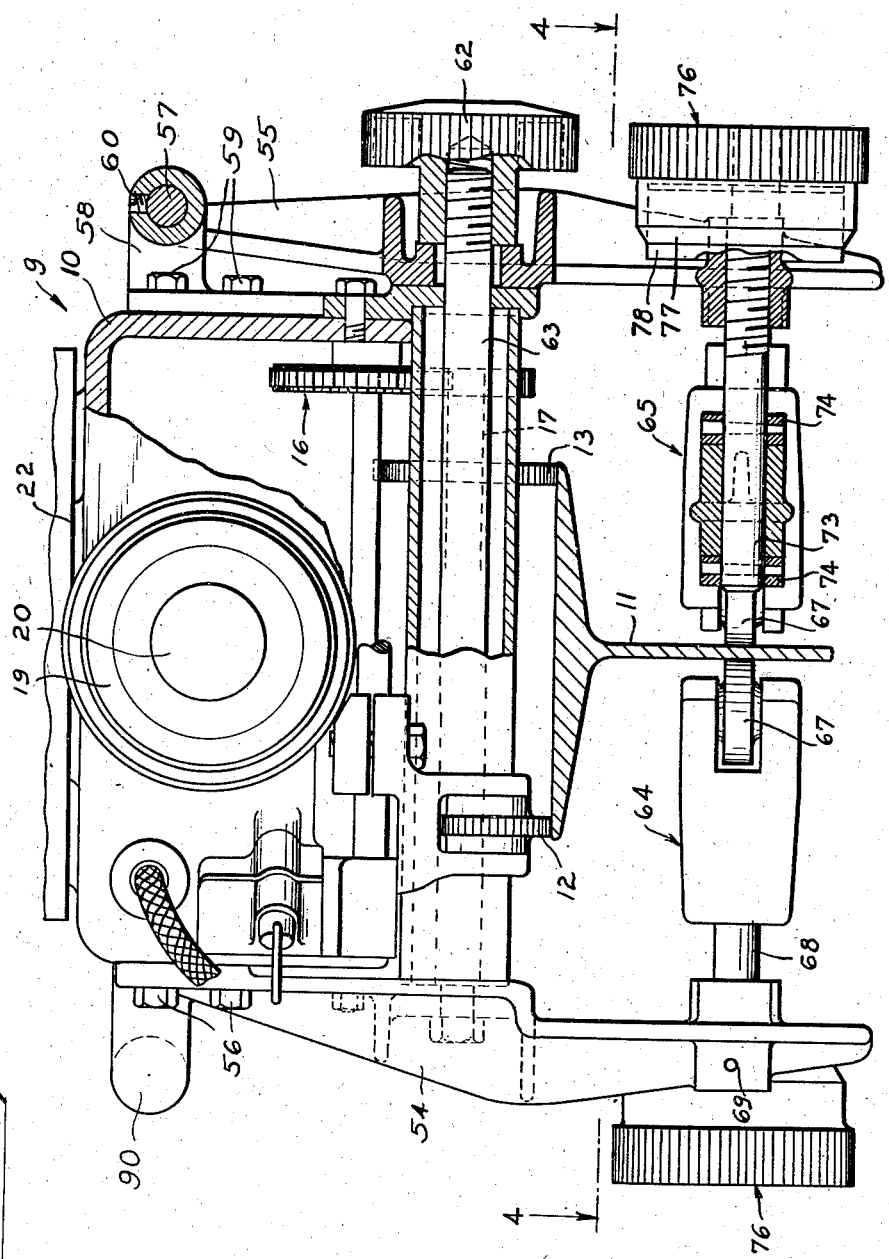

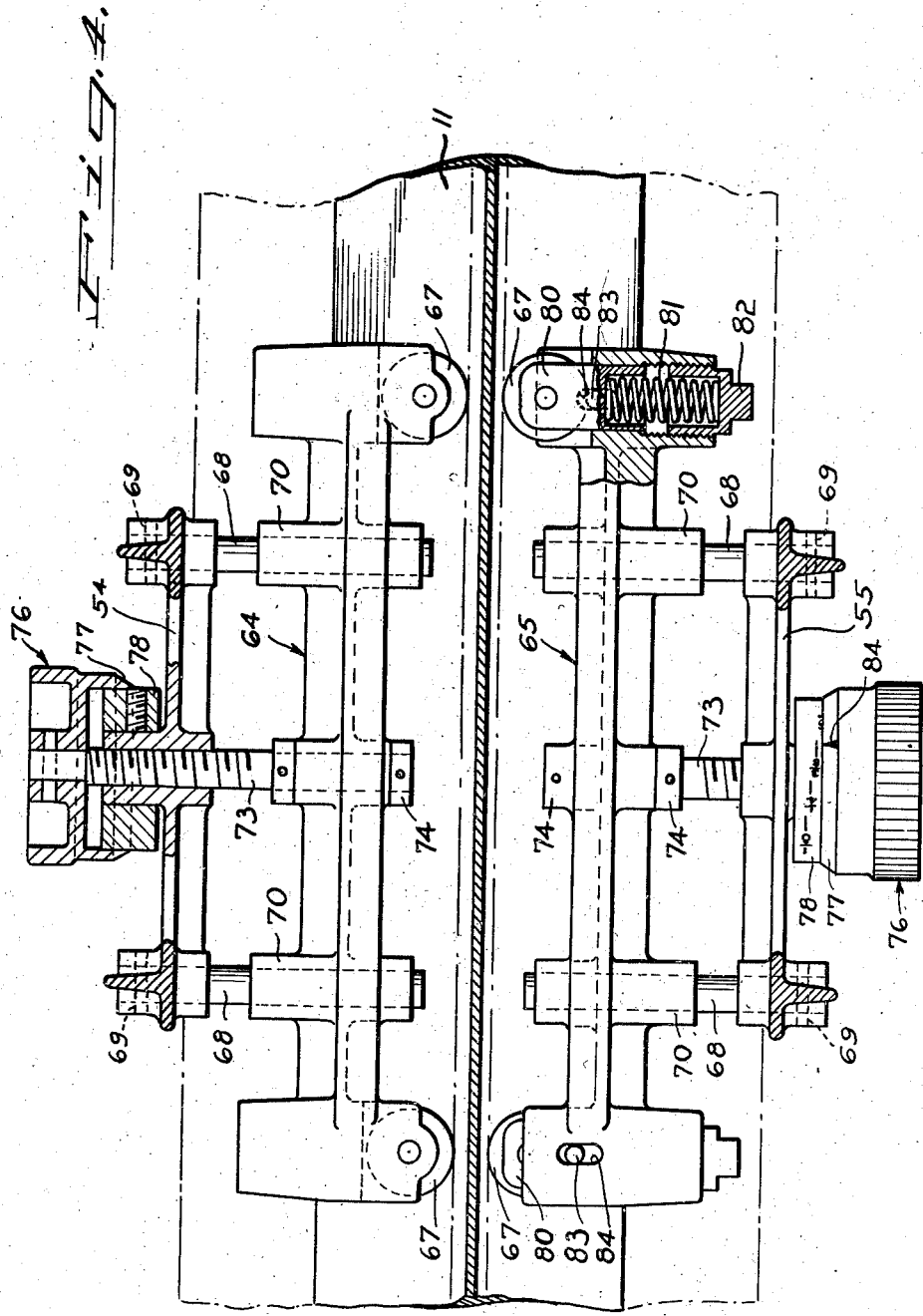

2,270,242

UNITED STATES PATENT OFFICE 2,270,242

BEAM CUTTING MACHINE

James L. Anderson, Closter, N. J., assignor to Air Reduction Company, Incorporated, New York, N. Y., a corporation of New York Application April 23, 1940, Serial No. 331,069

11 Claims. (Cl. 266—23)

This invention relates to apparatus for cutting beams.

In the construction of ship hulls with standard rolled sections such as I-beams, it is necessary to cut away portions of the inside flanges at some stations in order to make room for other structure in the hull. Because of the frequent occasions when these inside flanges of I-beams are objectionable in ship construction, special sections are made for use in ships. These ship beams differ from the conventional I-beam in that they have a relatively narrow head along the top of the web in place of the usual I-beam flange. Along the bottom of the web the ship beam flange is similar to that of an I-beam.

It is an object of this invention to provide an improved cutting machine for cutting standard beams into sections suitable for ship hulls or other structures for which the standard rolled sections are not entirely suitable. With this invention the flange of an I-beam can be cut along both sides of the web and so close to the web that the section can be used in any location where a special ship beam can be used.

Another object of the invention is to provide a beam cutting machine that runs on the flange of the beam and is suitable for cutting beams of different size. Since the flange width is different for every size of beam, the cutting machine of this invention is guided from the beam web, there being less total variation in web thickness than in flange width.

Another feature of the invention relates to the torch supporting and adjusting structure which enables the machine to make two cuts simultaneously along parallel paths that are spaced by a distance less than the diameter of one of the cutting torches.

Other objects, features, and advantages of the invention will appear or be pointed out as the specification proceeds.

In the drawings forming a part hereof:

Fig. 1 is a side elevation of a flange cutting machine embodying the invention.

Fig. 2 is a top plan view of the machine shown in Fig. 1, but with the torches removed.

Fig. 3 is an enlarged view in which the left hand portion is a front elevation of the machine shown in the other figures, and the right hand portion is a section taken on the line 3—3 of Fig. 1.

Fig. 4 is an enlarged sectional view taken on the line 4—4 of Fig. 3, but showing the way in which the guide rollers are moved apart by wider beam webs.

The cutting machine includes a carriage 9 comprising a housing 10 with four wheels by which it is stably supported on the flat top surface of a flange of a beam 11. There are two front wheels 12 that are idlers, and two rear wheels 13 driven by a motor 14 through a reduction gear unit 15 and other gearing 16 between the reduction gear unit and an axle 17 on which the rear wheels 13 are fastened. It is a feature of the invention that the tread of the carriage wheels is substantially narrower than the carriage width since the tread determines the smallest size of beam on which the machine can be used.

The motor is equipped with a centrifugal governor 19 that can be adjusted by a knob 20 to change the speed at which the governor becomes effective. Such governors are well known in the cutting machine art. No further explanation of the power driving mechanism of the carriage is necessary for a full understanding of this invention.

On top of the housing 10 there is a machined pad 22 from which two spaced-apart posts 23 and 24 (Fig. 2) extend upward. A bracket 26 has a split clamp at one end that fits over the post 23 and is secured to the post by a clamping screw 27. A torch-supporting bar 28 is slidable lengthwise in a horizontal opening in the bracket 26 as a bearing. A rack 29 on the bar 28 meshes with a pinion 30 that is turned by a knob 31 on the bracket to shift the bar 28 lengthwise in the bracket. The friction of the parts is sufficient to prevent the bar 28 from moving lengthwise in the bracket 26 except when a turning force is applied to the knob 31.

A torch-holder bracket 33 has a stem that extends into a split clamp 34 at one end of the bar 28. The clamp 34 has a screw 35 by which the clamping force can be increased or relaxed. A graduated scale on the torch-holder bracket 33 adjacent an index 36 on the split clamp is used for setting the torch-holder bracket 33 in any desired angular relation about the axis of its stem that is held in the clamp 34.

A torch holder 38 comprises a split clamp 39 with clamping screws 40 and a stem 41 that extends into a split clamp of the bracket 33. Pressure of the bracket clamp against the stem 41 is controlled by a clamp screw 42. An index on the bracket 33 is associated with a scale on the torch holder for setting the torch holder in different positions around the axis of the stem 41. This angular adjustment is about an axis at right angles to the axis of rotation of the bracket 33 in the clamp 34 and the torch holder is therefore universally adjustable.

A torch 44 (Fig. 1) in the torch holder 38 is shifted lengthwise by conventional rack and pinion mechanism operated by a knob 45. The friction for holding the torch 44 at any set elevation is controlled by adjusting the clamping pressure of the screws 40.

A second torch 46 is supported in a torch holder 47 which is identical in construction to the torch holder 38 but turned upside-down to locate its adjusting knob 48 on the opposite side from the knob 45. The structure by which the torch holder 47 is connected with the post 24 (Fig. 2) of the carriage includes a bar 50 and bracket 51 with a bar adjusting knob 52, and all of the connecting structure is the same as that by which the torch holder 38 is connected with the post 23, but with certain of the parts turned around to accommodate them to the other side of the machine. It is a feature of the machine that the torch holders are off-set toward one another to bring them closer together.

It is also a feature of the invention that the bar 28 extends out far enough beyond the carriage to locate the torch holder 38 and its supporting bracket beyond the torch holder 47. This permits the torches to be located in positions to cut along lines that are close together. If the torches were side by side their own diameters and the thickness of the torch holders would limit the closeness of their lines of cut to a spacing very much greater than the thickness of a beam web.

The carriage 9 is guided along the beam 11 by rollers in side frames 54 and 55, best shown in Fig. 3. The side frame 54 is rigidly fastened to the body of the carriage 9 by screws 56 and extends well below the top of the beam 11. The side frame 55 is connected with the body of the carriage by a pivot shaft 57 that passes through a support 58 fastened to the side of the carriage by screws 59. The pivot shaft 57 is held against endwise movement by a set screw 60.

The frame 55 is held against the side of the carriage by a knob 62 threaded over the end of a bolt 63 (Fig. 3). When the knob 62 is taken off the bolt 63, the side frame 55 can be swung back away from the beam to make it possible to remove the machine transversely from a beam or to put the machine on a new beam from the side. At the lower end of each of the side frames 54 and 55, there are roller supports 64 and 65, best shown in Fig. 4.

The roller support 64 has two rollers 67 at its opposite end in position to contact with the web of the beam. Fig. 4 shows the web of the beam 11 in full lines, and the web of a larger beam in dot and dash lines. The rollers 67 are shown in the position they would occupy when in contact with the web of the larger beam. Parallel shafts 68 extend into sockets in the side frame 54 and are fastened to the side frame by pins 69. The roller support 64 has bearings 70 on which the support 64 slides lengthwise on the shafts 68.

The support 64 is moved toward and from the side frame 54, to adjust the positions of the rollers 67 for flanges of different thickness, by a lead screw 73 that threads through the side frame 54. An unthreaded end of the lead screw 73 turns in a bearing in the support 64 and there are thrust collars 74 pinned to the lead screw on both sides of the roller support 64.

The lead screw 73 is turned by a knob 76 pinned to the end of the screw. A skirt 77 on the knob 76 extends over a collar 78 carried by the frame 54.

The support 65 is similar to the support 64 except for the mounting of the rollers 67. In the support 65 each of the rollers 67 has its axle carried by a slide 80 that is thrust toward the web of the beam by a spring 81 compressed between the slide 80 and a cap 82 that forms the bottom of the socket in which the slide moves. A stud 83 extending from the slide 80 into a slot 84 limits the total movement of the slide 80 and keeps the slides from turning. Pressure of the spring 81 can be controlled by screwing the cap 82 one way or the other.

Parts of the side frame 55 and support 65 corresponding to similar parts of the frame 54 and support 64 on the other side of the web are indicated by the same reference characters. The knob 76 associated with the side frame 55 has an index 84 on the skirt 77, and there is a graduated scale on the collar 78 around which the index moves to indicate the position of the support 65 as the knob 76 is turned one way or the other.

The controls are grouped on top of the carriage, as shown in Fig. 2, and include a power cut-off switch 86, a reversing switch 87, and a clutch lever 88. The machine is light enough for one man to carry and it is conveniently carried by a handle 90 on one side of the carriage.

Changes and modifications can be made in the illustrated embodiment of the invention and some features can be used without others.

I claim:

1. A machine for cutting a beam that has flanges and a web, said machine including a self-propelled torch carriage with wheels for stably supporting the carriage on the flat top surface of the flange of said beam, supports extending downward from the carriage, side rollers on said supports below the carriage wheels and in positions to contact with both sides of the beam web to prevent lateral displacement of the carriage as it travels along the length of the beam, and means supported by the carriage for holding a cutting torch in position to cut the flange on which the carriage runs.

2. A machine for cutting a beam that has flanges and a web, said machine including a torch carriage with wheels for stably supporting the carriage on the flat top surface of a flange of said beam, side rollers connected with the carriage and located below the carriage wheels in position to contact with both sides of the web of the beam for preventing lateral displacement of the carriage on the beam, a slidable support by which one or more of said side rollers are connected with the carriage, a frame hinged to one side of the carriage, and guides on said frame in which the roller support slides toward the web of the beam.

3. A machine for cutting a beam that has flanges and a web, said machine comprising a carriage with wheels that run on the top flange of the beam, supports extending downward from the carriage, side rollers on said supports below the carriage wheels and located in positions to contact with both sides of the web of the beam as the carriage travels lengthwise along the top surface of the beam, and means supported by the carriage for holding a torch in position to cut the flange on which the carriage runs.

4. A machine for cutting a beam that has flanges and a web, said machine including a self-propelled torch carriage with wheels stably supporting it on the flat surface of the flange of a beam, side rollers below the carriage wheels for contacting with both sides of the web of the beam to prevent transverse displacement of the carriage on the beam flange, and means connecting the side rollers with the carriage including a frame hinged to the carriage, and adjustable means for moving the side rollers of said frame toward the web.

5. In a machine for cutting the flange of a beam that has flanges and a web, a torch carriage with supporting wheels that run on the flat surface of the flange to be cut, a governor-controlled motor on the carriage, driving connections between the motor and one or more of the carriage wheels, and idler rollers, below the carriage-supporting wheels and independent of said wheels, and supports connecting said idler rollers with the carriage in position to contact with both sides of the beam web to prevent transverse displacement of the carriage on the flat surface of the flange.

6. A machine for cutting the flange of a beam including in combination a torch carriage with two front wheels and two back wheels for stably supporting the carriage on the surface of the flange to be cut, said wheels having a tread substantially narrower than the width of the carriage for operation on beams of small size, a governor-controlled motor on the carriage, driving connection including speed-reducing gearing through which the motor drives the back wheels of the carriage, frames extending downward from both sides of the carriage to a level substantially below the carriage wheels, a hinge connection between the carriage and the frame on one side of the carriage, said hinged connection being located near the top of the carriage and having an axis extending lengthwise of the carriage, screw means for holding the frames on both sides of the carriage in fixed relations to the carriage, guides connected to the lower portions of each side frame, a roller support movable along the guides toward and from the web of a beam when the carriage is supported on the flange of the beam, rollers carried by the support in position to contact with the web, lead screws for moving the roller supports toward and from the web, and spring means associated with the rollers of one support for urging the rollers into yielding contact with the web.

7. A beam-cutting machine comprising a carriage with wheels for stably supporting it on the top flange of a beam that has flanges and a web, said wheels having a narrow tread less than the width of the flange of the narrowest beam with which the machine is intended to be used, rollers for contact with the sides of the beam to prevent transverse displacement of the carriage, and side roller-supporting means spaced in the region of the flange by a distance substantially greater than the tread and greater than the width of the flange of the largest beam with which the machine is intended to be used, said means being connected with the carriage and adjustable to move the rollers into position to contact with beams of different size.

8. A beam cutting machine comprising a wheeled carriage with a narrow tread for running on flanges of large or small size beams; side frames on the carriage extending downward from the carriage to a level substantially below the carriage wheels, said frames being spaced from one another by a distance equal to the flange width of the largest beam on which the machine is intended to be used, and means connecting rollers to the side frames in position to contact with the web of a beam when the carriage is supported on the flange.

9. A machine for cutting I-beams comprising a wheeled carriage with a narrow tread for running on flanges of large or small size beams; side frames on the carriage extending downward from the carriage to a level substantially below the carriage wheels, said frames being spaced from one another by a distance equal to the flange width of the largest beam on which the machine is intended to be used, means connecting rollers to the side frames in position to contact with the web of a beam when the carriage is supported on the flange, and torch holders connected with the carriage and positioned to move two cutting torches along parallel lines immediately above the juncture of the opposite side faces of the web of said I-beam with the flange on which the torch carriage is supported.

10. A machine for cutting I-beams comprising a wheeled carriage with a narrow tread for running on flanges of large or small size beams; side frames on the carriage extending downward from the carriage to a level substantially below the carriage wheels, said frames being spaced from one another by a distance equal to the flange width of the largest beam on which the machine is intended to be used, means connecting rollers to the side frames in position to contact with the web of a beam when the carriage is supported on the flange, and two torch supports connected to the carriage and located one ahead of the other beyond the rearward end of the machine, said torch supports being adjustable transversely of the direction of movement of the carriage and constructed and arranged to bring cutting torches carried by the supports into positions to cut simultaneously along parallel lines spaced by a distance equal to the thickness of the beam web.

11. A machine for cutting I-beams comprising a wheeled carriage with a narrow tread for running on flanges of large or small size beams; side frames on the carriage extending downward from the carriage to a level substantially below the carriage wheels, said frames being spaced from one another by a distance equal to the flange width of the largest beam on which the machine is intended to be used, means connecting rollers to the side frames in position to contact with the web of a beam when the carriage is supported on the flange, two torch holders for supporting torches in position to simultaneously cut the flange along planes that pass through the juncture of the flange with opposite side faces of a web of the beam, and means connecting the torch holders to the carriage with one torch holder ahead of the other.

J. L. ANDERSON.